United States Patent [19]

Maeda et al.

[11] Patent Number: 4,965,315
[45] Date of Patent: Oct. 23, 1990

[54] THERMOPLASTIC RESIN COMPOSITION

[75] Inventors: Tetsuro Maeda, Ichihara; Akihiro Okamoto, Yokohama, both of Japan

[73] Assignee: Denki Kagaku Kogyo Kabushiki Kaisha, Tokyo, Japan

[21] Appl. No.: 726,362

[22] Filed: Apr. 23, 1985

[30] Foreign Application Priority Data

May 25, 1984 [JP] Japan .................................. 59-104732

[51] Int. Cl.$^5$ .............................................. C08L 51/04
[52] U.S. Cl. ........................................ 525/86; 525/83; 525/84; 525/85
[58] Field of Search ............................... 525/86, 84, 85

[56] References Cited

U.S. PATENT DOCUMENTS 4,520,165  5/1985  Zabrocki et al. ..................... 525/86

Primary Examiner—Jacob Ziegler
Attorney, Agent, or Firm—Oblon, Spivak, McClelland, Maier & Neustadt

[57] ABSTRACT

A thermoplastic resin composition composed of a mixture comprising a graft polymer obtained by subjecting a monomer mixture of an aromatic vinyl monomer and a vinyl cyanide monomer to emulsion polymerization in the presence of a diene rubber latex, and a hard polymer obtained by copolymerizing a monomer mixture of an aromatic vinyl monomer and a vinyl cyanide monomer, in which the number average particle size Dn of diene rubber particles contained in the composition is at most 0.1 μm, the ratio (Dw/Dn) of the weight average particle size Dw to the number average particle size Dn of the diene rubber particles is at least 5.0, the graft rate of said graft polymer is at least 60%, and the content of an emulsifier and a reaction product of an emulsifier is not higher than 2% by weight.

9 Claims, No Drawings

THERMOPLASTIC RESIN COMPOSITION

BACKGROUND OF THE INVENTION

1. Field of the Invention

The present invention relates to a thermoplastic resin composition having excellent thermal stability, which presents excellent surface gloss when formed into a molded product, particularly when injection-molded at a high temperature.

2. Description of the Prior Art

ABS resins have well balanced physical properties such as mechanical strength, moldability and surface gloss, and they are widely used in various fields including automobile parts, parts of electric appliances, and parts of office appliances. Among such uses, there are some wherein particularly good surface gloss is required.

It is known that the surface gloss of a molded product of ABS resin is very much influenced by the particle size of rubber particles contained in the resin. Namely, the smaller the particle size is, the higher the surface gloss of the ABS resin becomes. Further, the surface gloss is also influenced by the dispersed condition of rubber particles. Namely, the better the dispersed condition is, the higher the surface gloss of the resulting ABS resin becomes.

In an ABS resin containing rubber particles having a small particle size, the distance between the rubber particles dispersed in the resin is smaller than that of an ABS resin containing rubber particles having a large particle size, and therefore the frequency of collision of the rubber particles to one another during the melt shearing process is higher. Accordingly, in the case of rubber particles having a low graft rate, agglomeration of the rubber particles is likely to take place due to the collision. Accordingly, the surface gloss of a molded product thereby obtainable tends to be poor, and in an extreme case, silver streaking appears on the surface of the molded product.

Namely, in order to obtain an ABS resin having good surface gloss, it is necessary to employ a rubber having a small particle size and to sufficiently increase the graft rate of the rubber particles. To obtain such an ABS resin, a so-called emulsion graft polymerization method is most suitable wherein emulsion polymerization of monomers to be grafted is conducted in the presence of a rubber latex obtained by emulsion polymerization. However, in an ABS resin obtainable by such emulsion graft polymerization, the emulsifier and a reaction product of the emulsifier with a precipitating agent i.e. an emulsifier reaction product, are likely to remain. Accordingly, undesirable phenomena for molding, such as a deterioration of the thermal stability attributable to the emulsifier and the emulsifier reaction product, are observable.

The deterioration of the surface gloss of the ABS resin is distinctly observed especially in the case of injection molding at a high temperature. Likewise, the deterioration of the thermal stability is remarkable during the high temperature molding. Such deteriorations observed during the high temperature molding of the ABS resin put a substantial limitation to the molding conditions for producing a molded product of ABS resin having a good outer appearance, such being undesirable from the industrial point of view.

It is known to dilute an ABS resin having a high content of a diene rubber produced by emulsion graft polymerization, with an ABS resin having a low content of a diene rubber or an AS resin containing no diene rubber, produced by suspension polymerization or bulk polymerization, to produce an ABS resin wherein the content of the emulsifier reaction product is suppressed. However, when an ABS resin having a high content of a diene rubber is produced by emulsion graft polymerization by using a rubber having a small particle size, and then diluted to obtain an ABS resin having a desired rubber content, the surface gloss of a molded product of the ABS resin thereby obtained will be low, and in an extreme case, silver streaking will be observed on the surface of the molded product.

SUMMARY OF THE INVENTION

It is an object of the present invention to simultaneously solve the problems of the reduction of surface gloss and the deterioration of thermal stability observed in an injection-molded product of ABS resin, particularly in a molded product obtained by high temperature injection molding.

According to the present invention, the above object can be attained by a thermoplastic resin composition composed of a mixture comprising a graft polymer obtained by subjecting a monomer mixture of an aromatic vinyl monomer and a vinyl cyanide monomer to emulsion polymerization in the presence, of a diene rubber latex, and a hard polymer obtained by copolymerizing a monomer mixture of an aromatic vinyl monomer and a vinyl cyanide monomer, in which the number average particle size $Dn$ of diene rubber particles contained in the composition is at most 0.1 $\mu$m, the ratio ($Dw/Dn$) of the weight average particle size $Dw$ to the number average particle size $Dn$ 20 of the diene rubber particles is at least 5.0, the graft rate of said graft polymer is at least 60%, and the content of an emulsifier and a reaction product of an emulsifier is not higher than 2% by weight.

With the ABS resin composition of the present invention, the problems in the high temperature molding such as the reduction of surface gloss or the deterioration of thermal stability, can be solved, and accordingly, the failure in the molding can be minimized. Thus, the effect of the present invention is extremely advantageous from the industrial point of view.

DETAILED DESCRIPTION OF THE INVENTION

Now, the present invention will be described in detail with reference to the preferred embodiments.

The diene rubber latex to be used in the present invention, is obtainable by the emulsion polymerization of a diene monomer or a mixture of a diene monomer with other copolymerizable monomers. As such a diene monomer, there may be mentioned butadiene, isoprene or chloroprene. As other copolymerizable monomers, there may be mentioned an aromatic vinyl monomer such as styrene, α-methylstyrene, vinyltoluene or t-butylstyrene; a vinyl cyanide monomer such as acrylonitrile or methacrylonitrile; and a acrylate or methacrylate monomer such as methyl methacrylate, ethyl acrylate or butyl acrylate. Specific examples of the diene rubber to be used advantageously in the present invention, include polybutadiene, polyisoprene, poly(butadiene-styrene), poly(butadiene-acrylonitrile), poly(butadiene-methyl methacrylate) and poly(butadienebutyl acrylate). These diene rubber latexes may be used alone or in combination.

In the present invention, a mixture of an aromatic vinyl monomer and a vinyl cyanide monomer is subjected to emulsion copolymerization, in some cases, together with other vinyl monomers copolymerizable therewith. As the aromatic vinyl monomer, there may be mentioned styrene, o-methylstyrene, vinyltoluene or t-butylstyrene. As the vinyl cyanide monomer, there may be mentioned acrylonitrile or methacrylonitrile. As the optionally employed vinyl monomer copolymerizable therewith, there may be mentioned methyl methacrylate, ethyl acrylate or butyl acrylate. As a preferred combination of the monomers, there may be mentioned styrene-acrylonitrile, styrene-α-methylstyrene-acrylonitrile, styrene-methylmethacrylate-acrylonitrile or α-methylstyrene-acrylo-nitrile. nitrile.

In the present invention, a preferred ratio of the monomers used for the emulsion polymerization in the presence of a diene rubber latex, is from 50 to 90% by weight of the aromatic vinyl monomer, from 10 to 40% by weight of the vinyl cyanide monomer and from 0 to 40% by weight of other copolymerizable vinyl monomers. A particularly preferred ratio is from 60 to 80% by weight of the aromatic vinyl monomer, from 20 to 35% by weight of the vinyl cyanide monomer and from 0 to 20% by weight of other copolymerizable vinyl monomers. If the content of the aromatic vinyl monomer is less than 50% by weight, the resulting resin tends to have poor moldability. On the other hand, if the content exceeds 90% by weight, the mechanical strength tends to be poor.

In the present invention, it is required that the graft rate of the graft polymer obtained by the emulsion copolymerization of the monomers in the presence of a diene rubber latex, is at least 60%. The graft rate is obtained by ([graft branch weight]/[diene rubber weight])×100(%). In the case of an ABS resin composed of a graft polymer having a graft rate of less than 60%, a distinct reduction of gloss due to the agglomeration of rubber particles is observed during the injection molding at a high temperature, such being undesirable.

The emulsifier to be used for the emulsion polymerization and emulsion graft polymerization of the diene rubber is preferably a carboxylate. The carboxylate includes a higher fatty acid salt or a resin acid salt. As specific examples of the higher fatty acid salt, there may be mentioned a caprylate, a caprate, a laurate, a myristate, a palmitate, a stearate, an oleate, a linolate or a linolenate. As the resin acid salt, an abietate may be mentioned. However, the higher fatty acid salt and the resin acid salt are produced, in many cases, as a mixture of various different compounds, and each of the above specific examples should be understood as a component of such a mixture. Further, as the cations of the carboxylate emulsifier, there may be mentioned alkali metal ions or ammonium ions. The alkali metal ions include potassium ions, sodium ions or lithium ions.

The graft polymer is recovered by subjecting the graft polymer latex to a precipitation process wherein the precipitation of the latex is conducted with an addition of a precipitating agent. With respect to the precipitation process, there is no particular restriction, and conventional techniques may be applied. As the precipitating agent, an acid and/or a water soluble salt may be effectively used. As such an acid, there may be mentioned hydrochloric acid, sulfuric acid, phosphoric acid or acetic acid. As the water soluble salt, there may be mentioned sodium chloride, ammonium chloride, calcium chloride, magnesium chloride, barium chloride, aluminum chloride, sodium sulfate, magnesium sulfate, aluminum sulfate, ammonium aluminum sulfate, potassium aluminum sulfate or sodium aluminum sulfate.

In the present invention, a hard polymer is added which is a copolymer of an aromatic vinyl monomer and a vinyl cyanide monomer, or a copolymer of such monomers with other vinyl monomers copolymerizable therewith. As such an aromatic vinyl monomer, there may be mentioned styrene, α-methylstyrene, vinyltoluene or t-butylstyrene. As the vinyl cyanide monomer, there may be mentioned acrylonitrile or methacrylonitrile. As other vinyl monomers copolymerizable therewith, there may be mentioned methyl methacrylate, ethyl acrylate or butyl acrylate. As a preferred combination of monomers, there may be mentioned styrene-acrylonitrile, styrene-α-methylstyrene-acrylonitrile, styrene-methylmethacrylate-acrylonitrile or α-methylstyrene-acrylonitrile.

One of the features of the present invention is to specify the content of the remaining unreacted emulsifier and the emulsifier reaction product which is a reaction product of the emulsifier used in the emulsion polymerization process with the precipitating agent added in the precipitation process of the emulsion polymer latex. Namely, the total amount of the emulsifier and the emulsifier reaction product contained in the resin composition prepared by mixing the graft polymer and the hard polymer, is required to be at most 2% by weight, preferably at most 1.5% by weight, more preferably at most 1% by weight. If the content of the emulsifier and its reaction product contained in the ABS resin composition exceeds 2% by weight, the thermal stability during the high temperature molding process tends to be poor, such being undesirable.

In order to bring the content of the emulsifier and its reaction product in the ABS resin composition to a level of at most 2% by weight, it is preferred to employ suspension polymerization or bulk polymerization for the polymerization of the hard polymer and to increase the content of the diene rubber (i.e. the rubber ratio) in the emulsion graft polymer. By increasing the rubber ratio in the graft polymer, the proportion of the graft polymer in the ABS resin composition lowers, whereby the formation of the reaction product of the emulsifier can be suppressed to a low level. The rubber ratio in the graft polymer is preferably from 40 to 62% by weight. If the rubber ratio is less than 40% by weight, it is difficult to control the content of the reaction product of the emulsifier in the ABS resin composition to a level of at most 2% by weight, whereby the thermal stability tends to be poor. On the other hand, if the rubber ratio exceeds 62% by weight, it tends to be difficult to bring the graft rate of the graft polymer to a level of at least 60%, whereby the gloss tends to be poor.

In order to bring the rubber ratio of the graft polymer to a level of from 40 to 62% by weight and the graft rate to a level of at least 60%, it is preferred to select the initiator for the graft polymerization. As the initiator, there may be employed cumene hydroperoxide, di-isopropylbenzene hydroperoxide benzoyl peroxide, di-t-butyl peroxide, di-cumyl peroxide or t-butyl peroxide. Particularly preferred is t-butyl peroxide, t-butyl cumyl peroxide, t-butyl peroxy acetate t-butyl peroxy benzoate or t-butyl peroxy isopropylcarbonate.

The diene rubber particles contained in the composition of the present invention have a number average particle size Dn of at most 0.1 μm, and the ratio (Dw/Dn) of the weight average particle size Dw to the number average particle size Dn is at least 5.0, preferably at least 7.0.

The average particle sizes were obtained by calculation in accordance with Dn=(Σfidi)/Σfi and Dw=(Σfidi$^4$)/(Σfidi$^3$), where fi is the proportion of the particles having a particle size of di obtained from a microscopic photograph of the ABS resin taken by a transmission-type electron microscope.

If the number average particle size Dn of the diene rubber particles exceeds 0.1 μm, the gloss of the ABS resin composition tends to be poor. If Dw/Dn is less than 5.0, the impact strength of the ABS resin composition tends to be poor.

The diene rubber is produced by the emulsion polymerization. There is no particular restriction with respect to the manner of controlling the particle size distribution of the diene rubber to the range prescribed by the present invention. For instance, as a method for after-treatment of the diene rubber latex obtained by the emulsion polymerization, there may be mentioned a method wherein the diene rubber latex is supplied to a pressure flow apparatus and subjected to agglomeration under pressure (Japanese Examined Patent Publications No. 982/1966 and No. 4458/1973), a method wherein an acid and/or a water soluble salt is added to the diene rubber latex to carry out the agglomeration (Japanese Examined Patent Publications No. 8390/1964 and No. 3112/1967), a method wherein a water soluble polymer substance such as a polyvinyl alcohol, a polyethylene glycol-polypropylene glycol block copolymer or a carboxymethyl cellulose, is added to said latex, a method wherein an organic solvent is added to said latex, or a method wherein the temperature of said latex is reduced. As a method which may be applied during the emulsion polymerization of the diene rubber latex, there may be mentioned a seeding polymerization method (Japanese Examined Patent Publication No. 39194/1974), and a method wherein the latex concentration during the polymerization is controlled (Japanese Examined Patent Publication No. 16060/1973). However, other appropriate methods may also be employed.

To the composition of the present invention, there may be added an antioxidant, a weather resistant agent, an antistatic agent, a plasticizer, a coloring agent, a lubricant, a filler or a reinforcing material, as the case requires.

Now, the present invention will be described in further detail with reference to Examples. However, it should be understood that the present invention is by no means restricted by these specific Examples.

In the Examples and Comparative Examples, "parts" and "%" mean "parts by weight" and "% by weight".

REFERENCE EXAMPLE 1: Preparation of polybutadiene rubber latexes A to I

Into a stainless steel autoclave, there was charged 200 parts of pure water in which 2.0 parts of potassium stearate, 0.1 part of potassium persulfate and 0.2 part of sodium acetate were dissolved, and 0.08 part of divinylbenzene and 0.1 part of 4,4'-butylidene-bis-6-t-butyl-metacresol were added. Then, 100 parts of butadiene was supplied under pressure, and the polymerization was conducted at 65° C. for 30 hours under stirring.

After the expiration of 30 hours, unreacted butadiene was removed to obtain a polybutadiene rubber latex. The weight average particle size of the latex thereby obtained was 0.06 μm.

The weight average particle size was obtained by measuring the absorbance of the latex and comparing it with a calibration curve prepared on the basis of the relation between the absorbance and the weight average particle size with respect to polystyrene latexes having known weight average particle sizes.

Then, the above rubber latex was supplied to a homogenizer (Model 15M8TBA, manufactured by Manton-Gaulin Mfg. Co. Inc., U.S.A.) and kneaded under a pressure of 56 kg/cm$^2$ to obtain polybutadiene rubber latexes A to I.

REFERENCE EXAMPLE 2: Preparation of polybutadiene rubber latexes J to L

To the rubber latex obtained in Reference Example 1 and having a weight average particle size of 0.06 μm, a polyoxyethylene-polyoxypropylene block copolymer (the molecular weight of the polypropylene glycol: 2250, the amount of ethylene oxide in the total molecule: 40%) was added in an amount of 1.5 parts per 100 parts of the polybutadiene. While stirring the latex at a high shearing speed, an aqueous solution containing 5% of acetic acid was added to bring the pH of the latex to 6.5. Then, an aqueous solution containing 2% of potassium hydroxide was added to bring the pH of the latex to 11 to obtain polybutadiene rubber latexes J to L.

REFERENCE EXAMPLE 3: Preparation of styrene-butadiene copolymer (hereinafter referred to as "SBR rubber") latex M Five parts of the rubber latex (as the solid content) obtained in Reference Example 1 and having a weight average particle size of 0.06 μm, was charged into an autoclave, and 200 parts of pure water, 0.85 part of potassium stearate, 0.2 part of divinylbenzene, 0.15 part of t-dodecylmercaptan, 0.2 part of potassium persulfate and 24 parts of styrene were added. Then, 71 parts of butadiene was introduced under pressure, and the polymerization was conducted at 60° C. for 15 hours and at 70° C. for 10 hours, under stirring. The weight average particle size of the latex thereby obtained was 0.17 μm.

EXAMPLE 1

Into a stainless steel autoclave, 357 parts of polybutadiene rubber latex A (solid content: 28%) was charged, and then 210 parts of pure water, 0.005 part of ferrous sulfate, 0.01 part of tetrasodium ethylenediaminetetraacetate and 0.3 part of sodium formaldehyde sulfoxylate were added. The mixture was stirred in a nitrogen atmosphere. While maintaining the content at a temperature of 60° C., a monomer mixture comprising 25 parts of acrylonitrile, 75 parts of styrene, 0.6 part of t-dodecylmercaptan and a polymerization initiator as identified in Table 1 in an amount of 1.5 mmol per 100 parts of the monomer mixture, was continuously added to the above latex over a period of 5 hours.

After the completion of the addition of the monomer mixture, the polymerization initiator identified in Table 1 was added in an amount of 0.5 mmol per 100 parts of the monomer mixture, and the mixture was stirred at 70° C. for further 2 hours to complete the polymerization.

To the latex thereby obtained, an aqueous solution containing 8 parts of calcium chloride was poured, and the mixture was stirred at 95° C. for 3 minutes, whereby precipitates were obtained. The precipitates were dewatered, washed with water and then dried to obtain an ABS resin powder.

Then, 40 parts of this resin powder was mixed with 60 parts of an acrylonitrile-styrene suspension copolymer (AS resin; acrylonitrile content: 27%), 0.1 part of 2,6-di-t-butyl-4-methylphenol, 0.1 part of triphenyl phosphite and 2.0 parts of ethylene-bis-stearylamide, and the mixture was supplied to an extruder, whereby pellets were obtained.

Test pieces were prepared from the pellets, and the physical properties were measured. The results are shown in Table 1.

The measured values in the following Examples and Comparative Examples are those obtained by the following methods.

Izod impact strength: ASTM D-256.

Melt flow index: ASTM D-1238; measured at 250° under a load of 5 kg.

Gloss: The pellets were injection-molded by IS-125 injection molding machine manufactured by Toshiba Kikai K.K. into a sheet of 100×350×2 mm. The molding temperature was 220° C. and 280° C. The gloss values of the molded products thereby obtained, were measured at an angle of incidence of 60° by means of a digital variable angle gloss meter (Model UGV-4D, manufactured by Suga Shikenki K.K.). The gloss was measured at five positions other than the gate portion, and the average value was taken as the gloss value.

Thermal stability: The pellets were injection-molded by IS-125 injection molding machine manufactured by Toshiba Kikai K.K. to obtain a sheet of 90×50×2.5 mm. The molding temperature was 220° C. and 280° C. With respect to the product molded at 280° C., the molten resin in the cylinder was held for 15 minutes and then injection-molded, whereby the molded product obtained at the third shot was collected as the test sample. The color difference between the molded product from the molding at 220° C. and the molded product from the retention at 280° C. for 15 minutes was measured by means of a Color and Color Difference Meter (Model ND-101 DC, manufactured by Nippon Denshoku Kogyo K.K.). The resin having a great measured value of color difference undergoes a color change to a great extent due to the heat history, such being undesirable for the practical purpose.

Graft rate: The pellets were put into methyl ethyl ketone. The mixture was adequately shaked, and then centrifuged to separate an insoluble matter. The polybutadiene content in the insoluble matter was quantitatively analyzed by an iodine-addition method, and the graft rate was obtained by calculation in accordance with ([100−polybutadiene content]/polybutadiene content)×100(%).

Content of the emulsifier reaction product: The insoluble matter obtained from the measurement of the graft rate was burned to an ash, and calcium was quantitatively analyzed by AA 646 Atomic Absorption Spectrophotometer manufactured by Shimadzu Corporation. The measured value was multiplied by 606/40 times to obtain the amount of calcium stearate in the insoluble matter. The obtained value was corrected with the content of the insoluble matter in the ABS resin composition to obtain the amount of calcium stearate in the ABS resin composition. In the present invention, potassium stearate is used as the emulsifier, and calcium chloride is used as the precipitating agent. Accordingly, the emulsifier reaction product is calcium stearate.

Rubber particle size: A pellet of the ABS resin composition was fixed to a jig, and the surface was polished with a ultra-microtome (Model JUM-7, manufactured by JEOL, Ltd.). The polished test sample was immersed in an aqueous solution containing 1% of osmium tetraoxide ($OsO_4$) and left to stand at 23° C. for 12 hours, whereby rubber particles were dyed. A thin piece was cut from the dyed test sample by means of a microtome, and a microscopic photograph of the thin piece was taken by means of a transmission-type electron microscope (Model JUM-100S, manufactured by JEOL Ltd.). The photograph was developed and enlarged to obtain a picture of 25000 magnifications, and the rubber particle size di and its distribution fi were measured. The visual field for the measurement was 67 $\mu m^2$. The number average particle size and the weight average particle size were obtained as $Dn=(\Sigma fidi)/\Sigma fi$ and $Dw=(\Sigma fidi^4)/(\Sigma fidi^3)$.

EXAMPLE 2

Into a stainless steel autoclave, 100 parts (as calculated as the solid content) of the polybutadiene rubber latex (i.e. one of latexes B to F having different particles sizes, as identified in Table 2) was charged. Then, pure water in an amount required to bring the solid content upon the termination of the polymerization to a level of 30%, 0.005 part of ferrous sulfate, 0.01 part of tetrasodium ethylenediaminetetraacetate and 0.3 part of sodium formaldehyde sulfoxylate were added thereto, and the mixture was stirred in a nitrogen atmosphere. While maintaining the content at 60° C., a monomer mixture comprising 25 parts of acrylonitrile, 75 parts of styrene, 0.6 part of t-dodecylmercaptan and 0.2 part of t-butylperoxy acetate, was continuously added to the above latex over a period of 5 hours. After the completion of the addition of the monomer mixture, 0.07 part of t-butylperoxy acetate was added, and the mixture was further stirred at 70° C. for 2 hours to complete the polymerization.

The latex thereby obtained was subjected to the same after-treatment as in Example 1 to obtain an ABS resin powder.

This resin powder was blended in the same manner as in Example 1 and then supplied to an extruder, whereby pellets were obtained. Test pieces were prepared from the pellets, and the physical properties were determined. The results are shown in Table 2.

COMPARATIVE EXAMPLE 1

Pellets were obtained in the same manner as in Example 1 except that the polymerization initiator as identified in Table 3 was used. Test pieces were prepared from the pellets, and the physical properties were determined. The results are shown in Table 3.

In Experiment Nos. 11 to 14, the same rubber latex as used in Experiment Nos. 1 to 5 was used, and nevertheless, both of Dn and Dw/Dn were substantially different from those of Experiment Nos. 1 to 5. This is attributable to the fact that in the ABS resin compositions of Experiment Nos. 11 to 14, agglomeration of the rubber particles is remarkable. The remarkable agglomeration of rubber particles observed in the ABS resin compositions of Experiment Nos. 11 to 14 is considered to be attributable to the low graft rates. The low gloss values, particularly in the molded product from the molding at 280° C., is considered to be interrelated with the agglomeration of the rubber particles. From the measurements of the number of rubber particles with respect to the test pieces cut out from the molded product for the measurement of the surface gloss, it was found that there were 50.2 particles/$\mu m^2$ in the molded product from the molding at 220° C. of Experiment No. 2 and 49.2 particles/$\mu m^2$ in the molded product from the molding at 280° C. of Experiment No. 2, while there were 23.9 particles/$\mu m^2$ in the molded product from the molding at 220° C. of Experiment No. 12 and 15.9 particles/$\mu m^2$ in the molded product from the molding at 80° C. of Experiment No. 12. Thus, it is evident that in the molded product of Experiment No. 12, agglomeration of the rubber particles is remarkable.

EXAMPLE 3 and COMPARATIVE EXAMPLE 2

Into a stainless steel autoclave, 118 parts of polybutadiene rubber latex A as used in Example 1 was charged. Then, 225 parts of pure water, 0.005 part of ferrous sulfate, 0.01 part of tetra sodium ethylenediamine tetraacetate, 0.3 part of sodium aldehyde sulfoxylate and potassium stearate in an amount as identified in Table 4, were added thereto, and the mixture was stirred in a nitrogen atmosphere. While maintaining the content at 60° C., a monomer mixture comprising 25 parts of acrylonitrile, 75 parts of styrene, 0.4 part of t-dodecylmercaptan and 0.2 part of t-butylperoxy acetate, was continuously added to the above latex over a period of 5 hours. After the completion of the addition of the monomer mixture, 0.07 part of t-butylperoxy acetate was added, and the mixture was further stirred at 70° C. for 2 hours to complete the polymerization.

The latex thereby obtained was subjected to the same after-treatment as in Example 1 to obtain an ABS resin powder.

To 80 parts of this resin powder, 20 parts of an AS resin, 0.1 part of 2,6-di-t-butyl-4-methylphenol, 0.1 part of triphenylphosphite and 2.0 part of ethylene-bis-stearylamide were blended, and the blend was supplied to an extruder, whereby pellets were obtained. Test pieces were prepared from the pellets, and the physical properties were determined. The results are shown in Table 4.

It is evident that if the content of the emulsifier reaction product is outside the range of the present invention, the thermal stability will be poor.

EXAMPLES 4 and COMPARATIVE EXAMPLE 3

Into a stainless steel autoclave, 357 parts of polybutadiene rubber latex A as used in Example 1 was charged. Then, 210 parts of pure water, 0.005 part of ferrous sulfate, 0.01 part of tetrasodium ethylenediamine tetraacetate, 0.3 part of sodium formaldehyde sulfoxylate and 1.5 parts of potassium stearate were added thereto, and the mixture was stirred in a nitrogen atmosphere. While maintaining the content at 60° C., a monomer mixture comprising 25 parts of acrylonitrile, 75 parts of styrene, 0.4 part of t-dodecylmercaptan and the polymerization initiator as identified in Table 5, was continuously added to the above latex over a period of 5 hours. After the completion of the addition of the monomer mixtures, 0.07 part of azobisisobutylonitrile was added, and the mixture was further stirred at 70° C. for 2 hours to complete the polymerization.

The latex thereby obtained was subjected to the same after-treatment as in Example 1 to obtain an ABS resin powder.

To 40 parts of this resin powder, 60 parts of an AS resin, 0.1 part of 2,6-di-t-butyl-4-methylphenol, 0.1 part of triphenylphosphite and 2.0 parts of ethylene-bis-stearylamide were blended, and the blend was supplied to an extruder, whereby pellets were obtained. Test pieces were prepared from the pellets, and the physical properties were determined. The results are shown in Table 5.

COMPARATIVE EXAMPLE 4

Pellets were obtained in the same manner as in Example 2 except that polybutadiene rubber latexes G to I were used instead of latexes B to F. Test pieces were prepared from the pellets, and the physical properties were determined. The results are shown in Table 6.

In Experiment No. 22, the number average particle size Dn of the rubber particles is within the range of the present invention, but Dw/Dn is less than 5.0, whereby the impact strength is poor. In Experiment Nos. 23 and 24, Dn exceeds 0.1 $\mu m$, whereby the gloss is poor.

EXAMPLE 5 and COMPARATIVE EXAMPLE 5

Pellets were prepared in the same manner as in Example 2 except that polybutadiene rubber latexes J to L were used instead of latexes B to F. Test pieces were prepared from the pellets, and the physical properties were determined. The results are shown in Table 7.

EXAMPLE 6

Into a stainless steel autoclave, 60 parts (as calculated as the solid content) of polybutadiene rubber latex A and 40 parts (as calculated as the solid content) of SBR rubber latex M were charged. Then, pure water in an amount required to bring the solid content upon the termination of the polymerization to a level of 30%, 0.005 part of ferrous sulfate, 0.01 part of tetrasodium ethylenediaminetetraacetate and 0.3 part of sodium formaldehyde sulfoxylate were added thereto, and the mixture was stirred in a nitrogen atmosphere. While maintaining the content at 60° C., a monomer mixture comprising 25 parts of acrylonitrile, 75 parts of styrene, 0.6 part of t-dodecylmercaptan and 0.2 part of t-butylperoxy acetate, was continuously added to the above latex over a period of 5 hours. After the completion of the addition of the monomer mixture, 0.07 part of t-butylperoxy acetate was added, and the mixture was further stirred at 70° C. for 2 hours to complete the polymerization.

The latex thereby obtained was subjected to the same after-treatment as in Example 1 to obtain an ABS resin powder.

This resin powder was blended in the same manner as in Example 1, and supplied to an extruder, whereby pellets were obtained.

Test pieces were prepared from the pellets, and the physical properties were determined. The results were as follows:

| | |
|---|---|
| Izod impact strength: | 29 kgcm/cm |
| Melt flow index: | 18 g/10 min |
| Gloss: | 92% at 220° C., and 89% at 280° C. |
| Thermal stability: | 4.0 |
| Graft rate: | 88% |
| Content of the emulsifier reaction product: | 0.52% |
| Number average particle size Dn of rubber particles: | 0.0894 $\mu m$ |
| Dw/Dn of rubber particles: | 9.13 |

EXAMPLE 7 and COMPARATIVE EXAMPLE 6

30 parts of the ABS resin powder obtained in Example 2 or Comparative Example 4 was blended with 70 parts of an acrylonitrile-o-methylstyrene suspension copolymer (acrylonitrile content: 30%, relative viscosity in 1% methyl ethyl ketone at 23° C.: 1.61), 0.1 part of 2,6-di-t-butyl-4-methylphenol and 0.1 part of triphenylphosphite, and the blend was pelletized. Test pieces were prepared from the pellets, and the physical properties were measured. The results are shown in Table 8.

TABLE 1

(Example 1)

| | Experiment No. | | | | |
|---|---|---|---|---|---|
| | 1 | 2 | 3 | 4 | 5 |
| Polymerization initiator | t-Butyl hydroperoxide | t-Butyl peroxyacetate | t-Butyl peroxyisopropyl carbonate | t-Butyl cumyl peroxide | t-Butyl peroxy benzoate |
| Izod impact strength (kgcm/cm) | 28 | 28 | 30 | 30 | 30 |
| Melt flow index (g/10 min) | 12 | 14 | 11 | 12 | 14 |
| Gloss 200° C. (%) | 85 | 89 | 84 | 81 | 79 |
| Gloss 280° C. (%) | 82 | 87 | 80 | 76 | 72 |
| Thermal stability (color difference) | 3.2 | 3.4 | 3.3 | 3.4 | 3.4 |
| Graft rate (%) | 86 | 95 | 84 | 78 | 72 |
| Emulsifier reaction product (%) | 0.32 | 0.30 | 0.28 | 0.31 | 0.33 |
| Number average particles size Dn of rubber particles (μm) | 0.0733 | 0.0745 | 0.0763 | 0.798 | 0.782 |
| Dw/Dn of rubber particles | 11.2 | 11.0 | 10.8 | 10.6 | 10.1 |

TABLE 2

(Example 2)

| | Experiment No. | | | | |
|---|---|---|---|---|---|
| | 6 | 7 | 8 | 9 | 10 |
| Rubber latex | B | C | D | E | F |
| Izod impact strength (kgcm/cm) | 16 | 20 | 26 | 30 | 30 |
| Melt flow index (g/10 min) | 11 | 13 | 15 | 14 | 14 |
| Gloss 200° C. (%) | 91 | 89 | 89 | 86 | 85 |
| Gloss 280° C. (%) | 88 | 87 | 87 | 82 | 80 |
| Thermal stability (color difference) | 3.4 | 3.4 | 3.3 | 3.2 | 3.2 |
| Graft rate (%) | 92 | 97 | 90 | 88 | 81 |
| Emulsifier reaction product (%) | 0.30 | 0.32 | 0.34 | 0.31 | 0.32 |
| Number average particle size Dn of rubber particles (μm) | 0.0712 | 0.0722 | 0.0727 | 0.0877 | 0.0943 |
| Dw/Dn of rubber particles | 6.58 | 8.12 | 9.40 | 11.2 | 10.4 |

TABLE 3

(Comparative Example 1)

| | Experiment No. | | | |
|---|---|---|---|---|
| | 11 | 12 | 13 | 14 |
| Polymerization initiator | Benzoyl peroxide | Dicumyl peroxide | Lauroyl peroxide | t-Butyl peroxy 3,5,5-trimethyl hexoate |
| Izod impact strength (kgcm/cm) | 24 | 26 | 25 | 25 |
| Melt flow index (g/10 min) | 10 | 12 | 12 | 10 |
| Gloss 220° C. (%) | 66 | 64 | 66 | 62 |
| Gloss 280° C. (%) | 43 | 31 | 34 | 27 |
| Thermal stability (color difference) | 3.8 | 3.6 | 3.9 | 3.3 |
| Graft rate (%) | 42 | 50 | 44 | 38 |
| Emulsifier reaction product (%) | 0.31 | 0.33 | 0.34 | 0.31 |
| Number average particle size Dn of rubber particles (μm) | 0.0925 | 0.0874 | 0.0917 | 0.141 |
| Dw/Dn of rubber particles | 9.23 | 9.41 | 9.49 | 5.84 |

TABLE 4

| | Comparative Example 2 | | Example 3 | |
|---|---|---|---|---|
| | Experiment No. | | | |
| | 15 | 16 | 17 | 18 |
| Amount of the emulsifier (parts) | 5.3 | 4.0 | 2.5 | 2.0 |
| Izod impact strength (kgcm/cm) | 25 | 24 | 28 | 28 |
| Melt flow index (g/10 min) | 14 | 12 | 14 | 14 |

TABLE 4-continued

|  | Comparative Example 2 | | Example 3 | |
|---|---|---|---|---|
|  | Experiment No. | | | |
|  | 15 | 16 | 17 | 18 |
| Gloss 220° C. (%) | 71 | 88 | 90 | 91 |
| Gloss 280° C. (%) | 62 | 84 | 87 | 87 |
| Thermal stability (color difference) | 18.5 | 14.4 | 9.2 | 7.4 |
| Graft rate (%) | 62 | 75 | 105 | 110 |
| Emulsifier reaction product (%) | 3.6 | 2.7 | 1.6 | 1.2 |
| Number average particle size Dn of rubber particles (μm) | 0.0874 | 0.0793 | 0.0741 | 0.0744 |
| Dw/Dn of rubber particles | 9.83 | 9.88 | 11.2 | 10.8 |

TABLE 5

|  | Example 4 | | Comparative Example 3 |
|---|---|---|---|
|  | Experiment No. | | |
|  | 19 | 20 | 21 |
| Amount of diisopropylbenzene hydroperoxide (parts) | 0.3 | 0.2 | 0.1 |
| Amount of azobisisobutyronitrile (parts) | 0 | 0 | 0.2 |
| Izod strength (kgcm/cm) | 27 | 29 | 29 |
| Melt flow index (g/10 min) | 13 | 11 | 11 |
| Gloss 220° C. (%) | 72 | 70 | 62 |
| Gloss 280° C. (%0) | 66 | 62 | 30 |
| Thermal stability (color difference) | 3.6 | 3.4 | 5.2 |
| Graft rate (%) | 70 | 62 | 34 |
| Emulsifier reaction product (%) | 0.31 | 0.33 | 0.29 |
| Number average particle size Dn of rubber particles (μm) | 0.0768 | 0.0794 | 0.128 |
| Dw/Dn of rubber particles | 10.4 | 9.83 | 6.23 |

TABLE 6

| (Comparative Example 4) | | | |
|---|---|---|---|
|  | Experiment No. | | |
|  | 22 | 23 | 24 |
| Rubber latex | G | H | I |
| Izod strength (kgcm/cm) | 5 | 18 | 28 |
| Melt flow index (g/10 min) | 9 | 11 | 15 |
| Gloss 220° C. (%) | 92 | 66 | 65 |
| Gloss 280° C. (%) | 88 | 54 | 58 |
| Thermal stability (color difference) | 3.9 | 2.6 | 3.5 |
| Graft rate (%) | 94 | 84 | 71 |
| Emulsifier reaction product (%) | 0.23 | 0.31 | 0.38 |
| Number average particle size Dn of rubber particles (μm) | 0.0693 | 0.127 | 0.189 |
| Dw/Dn of rubber particles | 3.24 | 7.14 | 5.23 |

TABLE 7

|  | Example 5 | | Comparative Example 5 |
|---|---|---|---|
|  | Experiment No. | | |
|  | 25 | 26 | 27 |
| Rubber latex | J | K | L |
| Izod strength (kgcm/cm) | 24 | 26 | 28 |
| Melt flow index (g/10 min) | 12 | 10 | 8 |
| Gloss 220° C. (%) | 88 | 83 | 67 |
| Gloss 280° C. (%) | 86 | 80 | 48 |
| Thermal stability (color difference) | 4.3 | 4.8 | 3.7 |
| Graft rate (%) | 76 | 84 | 72 |
| Emulsifier reaction product (%) | 0.26 | 0.41 | 0.48 |
| Number average particle size Dn of rubber particles (μm) | 0.0742 | 0.0816 | 0.122 |
| Dw/Dn of rubber particles | 10.3 | 11.1 | 6.13 |

TABLE 8

|  | Example 7 | | Comparative Example 6 | |
|---|---|---|---|---|
|  | Experiment No. | | | |
|  | 28 | 29 | 30 | 31 |
| Rubber latex | D | F | G | H |
| Izod strength (kgcm/cm) | 13 | 15 | 3 | 11 |
| Melt flow index (g/10 min) | 4.2 | 3.3 | 2.3 | 2.6 |
| Gloss 220° C. (%) | 94 | 91 | 94 | 72 |
| Gloss 280° C. (%) | 92 | 87 | 89 | 53 |
| Thermal stability (color difference) | 4.2 | 3.6 | 3.7 | 3.4 |
| Graft rate (%) | 90 | 81 | 94 | 84 |
| Emulsifier reaction product | 0.38 | 0.31 | 0.31 | 0.42 |
| Number average particle size Dn of rubber particles (μm) | 0.0724 | 0.0906 | 0.0688 | 0.131 |
| Dw/Dn of rubber particles | 9.73 | 10.2 | 3.18 | 7.22 |

In the ABS resin composition of the present weight average particle size of the rubber particles contained in the composition are prescribed. In particular, the number average particle size is prescribed to be at most 0.1 μm, whereby it is possible to obtain a composition which presents excellent gloss when formed into a molded product, particularly when injection-molded at a high temperature.

The second essential requirement of the invention is the prescription of the graft rate. Even if the number average particle size of the rubber particles is prescribed to be at most 0.1 μm, if the graft rate is less than 60%, a high gloss value can not be expected in the molded product.

Further, the content of the emulsifier reaction product in the composition is prescribed to be at most 2% by weight, whereby it is possible to obtain a composition having excellent thermal stability even when molded at a high temperature.

Namely, the effects of the present invention are to attain a high gloss value and excellent thermal stability for a molded product obtained by injection molding at a high temperature.

What is claimed is:

1. A thermoplastic resin composition composed of a mixture comprising a graft polymer obtained by subjecting a monomer mixture of an aromatic vinyl monomer and a vinyl cyanide monomer to emulsion polymerization employing an emulsifier in the presence of a diene rubber latex of agglomerated diene rubber particles and recovering said graft polymer by use of a precipitation agent, and a hard polymer obtained by copolymerizing a monomer mixture of an aromatic vinyl monomer and a vinyl cyanide monomer, in which the number average particle size Dn of diene rubber particles contained in the composition is at most 0.1 μm, the ratio (Dw/Dn) of the weight average particle size Dw to the number average particle size Dn of the diene rubber particles is at least 5.0, the graft rate of said graft polymer is at least 60%, and the content of said emulsifier and the reaction product of a emulsifier with said precipitation agent is not higher than 2% by weight.

2. The thermoplastic resin composition according to claim 1, wherein the diene rubber latex is selected from the group consisting of polybutadiene, polyisoprene, poly(butadiene-styrene), poly(butadiene-acrylonitrile), poly(butadiene-methylmethacrylate) and poly(butadienebutyl acrylate).

3. The thermoplastic resin composition according to claim 1, wherein the aromatic vinyl monomer for each of the graft polymer and the hard polymer is selected from the group consisting of styrene, α-methylstyrene, vinyltoluene and t-butylstyrene, and the vinyl cyanide monomer for each of the graft polymer and the hard polymer is selected from the group consisting of acrylonitrile and methacrylonitrile.

4. The thermoplastic resin composition according to claim 1, wherein the monomer mixture for each of the graft polymer and the hard polymer contains an additional vinyl monomer selected from the group consisting of methyl methacrylate, ethyl acrylate and butyl acrylate.

5. The thermoplastic resin composition according to claim 1, wherein the monomer mixture for each of the graft polymer and the hard polymer is a combination selected from the group consisting of styrene-acrylonitrile, styrene-α-methylstyreneacrylonitrile, styrene-methylmethacrylate-acrylonitrile and α-methylstryene-acrylonitrile.

6. The thermoplastic resin composition according to claim 1, wherein the monomer mixture for the emulsion polymerization in the presence of the diene rubber latex, comprises from 50 to 90% by weight of an aromatic vinyl monomer, from 10 to 40% by weight of a vinyl cyanide monomer and from 0 to 40% by weight of other vinyl monomers copolymerizable with the aromatic vinyl monomer and the vinyl cyanide monomer.

7. The thermoplastic resin composition according to claim 1, wherein the content of the emulsifier and the reaction product thereof in the composition is not higher than 1.5% by weight.

8. The thermoplastic resin composition according to claim 1, wherein the graft polymer has a rubber ratio of from 40 to 62% by weight.

9. The thermoplastic resin composition according to claim 1, wherein the ratio (Dw/Dn) of the weight average particle size Dw to the number average particle size Dn is at least 7.0.

* * * * *